(12) United States Patent
Chen

(10) Patent No.: US 9,150,173 B2
(45) Date of Patent: Oct. 6, 2015

(54) EMBRACING MECHANISM FOR VEHICLE WHEELS AND VEHICLE COMPRISING THE SAME

(71) Applicant: Shenli Chen, Kunming (CN)

(72) Inventor: Shenli Chen, Kunming (CN)

(\*) Notice: Subject to any disclaimer, the term of this patent is extended or adjusted under 35 U.S.C. 154(b) by 0 days.

(21) Appl. No.: 14/523,970

(22) Filed: Oct. 27, 2014

(65) Prior Publication Data
US 2015/0041236 A1 Feb. 12, 2015

Related U.S. Application Data

(63) Continuation-in-part of application No. PCT/CN2013/000382, filed on Apr. 2, 2013.

(30) Foreign Application Priority Data

Apr. 25, 2012 (CN) .......................... 2012 1 0123737

(51) Int. Cl.
*B60R 19/00* (2006.01)
*B60R 19/02* (2006.01)
*B60T 1/04* (2006.01)
*B60R 19/38* (2006.01)

(52) U.S. Cl.
CPC ................. *B60R 19/00* (2013.01); *B60R 19/02* (2013.01); *B60R 19/38* (2013.01); *B60T 1/04* (2013.01)

(58) Field of Classification Search
CPC ........ B60R 19/00; B60R 19/02; B60R 19/40; B60R 2019/002; B60R 2019/005; B60T 1/04
See application file for complete search history.

(56) References Cited

U.S. PATENT DOCUMENTS

| 3,805,911 A | * | 4/1974 | Le Salver ..................... 180/54.1 |
| 5,398,775 A | * | 3/1995 | Lee .............................. 180/274 |
| 7,819,218 B2 | * | 10/2010 | Eichberger et al. ........... 180/274 |
| 2015/0130217 A1 | * | 5/2015 | Shaner et al. ............... 296/187.1 |

FOREIGN PATENT DOCUMENTS

DE 4302240 A1 * 8/1993
WO WO 2010148633 A1 * 12/2010

\* cited by examiner

*Primary Examiner* — Drew Brown
(74) *Attorney, Agent, or Firm* — Matthias Scholl P.C.; Matthias Scholl

(57) ABSTRACT

An embracing mechanism for vehicle wheels including: a forward-pushing base disposed in front of a wheel, a backward-pulling base disposed behind the wheel, and a downward-pressing base disposed above the wheel. The forward-pushing base is connected to the backward-pulling base via an upper transmission box and a lower transmission box. The lower transmission box is provided with a front resistant spring and a rear resistant spring. The downward-pressing base is hinged to the forward-pushing base and the backward-pulling base via hinge parts, respectively.

9 Claims, 6 Drawing Sheets

EMBRACING MECHANISM FOR VEHICLE WHEELS AND VEHICLE COMPRISING THE SAME

CROSS-REFERENCE TO RELATED APPLICATIONS

This application is a continuation-in-part of International Patent Application No. PCT/CN2013/000382 with an international filing date of Apr. 2, 2013, designating the United States, now pending, and further claims priority benefits to Chinese Patent Application No. 201210123737.3 filed Apr. 25, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to a vehicle part and a vehicle in the field of the vehicle design and manufacture, and more particularly to an embracing mechanism for vehicle wheels and a vehicle comprising the same.

2. Description of the Related Art

Conventionally, the damping and absorption of the impact energy by the compression and deformation of the front section and the rear section of a car body is very limited. With the fast development of the freeways, the travel speed of cars largely increases, and so does the crash force. Thus, it is urgent to develop mechanisms to improve the damping and absorption of the impact energy in order to increase safety.

SUMMARY OF THE INVENTION

In view of the above-described problems, it is one objective of the invention to provide an embracing mechanism for vehicle wheels that can buffer, absorb, and decrease the violent impact, and simultaneously convert the horizontal impact transmitted forward or backward in the longitudinal direction of the vehicle into opposite pressures and a vertically downward force, and embrace the wheel from the forward, the backward, and the downward directions. The excellent bearing and compression performance of the pneumatic tire is utilized to transmit the decreased impact to the ground, thereby preventing the vehicle structure from crushing and damage.

It is another object of the invention to provide a vehicle comprising an embracing mechanism for vehicle wheels that can buffer, absorb, and decrease the violent impact, and simultaneously embrace the wheel from the forward, the backward, and the downward directions, and finally transmit the decreased impact to the ground, thereby preventing the vehicle structure from damage and protecting passengers.

To achieve the above objective, in accordance with one embodiment of the invention, there is provided an embracing mechanism for vehicle wheels comprising: a forward-pushing base disposed in front of a wheel, a backward-pulling base disposed behind the wheel, and a downward-pressing base disposed above the wheel. The forward-pushing base is connected to the backward-pulling base via an upper transmission box and a lower transmission box. The lower transmission box is provided with a front resistant spring and a rear resistant spring. The downward-pressing base is hinged to the forward-pushing base and the backward-pulling base via hinge parts, respectively. During buffering and absorbing the impact, the horizontal impact transmitted forward or backward in the longitudinal direction is converted into opposite pressures and a vertically downward force and embraces the wheel simultaneously. The excellent bearing and compression performance of the pneumatic tire is utilized to transmit the impact force to the ground, so that the vehicle structure from is prevented from crushing and damage and the passengers are protected, thereby realizing impact resistance, vehicle protection, and passenger protection.

In a class of this embodiment, the forward-pushing base comprises a forward-pushing frame and a pressure-bearing frame connected to a middle part of the forward-pushing frame. An upper part of a front end of the pressure-bearing frame is provided with an upper raised head, and a lower part of the front end of the pressure-bearing frame is provided with a lower raised head. Two sides of each of the upper raised head and the lower raised head comprise grooves. A middle part of the pressure-bearing frame is provided with a vertical slot. An upper part of the forward-pushing frame is connected to an upper forward-pushing rack. A bottom part of the forward-pushing frame comprises a clip foot. A middle part of the forward-pushing frame is connected to a lower forward-pushing rack via a transverse push rod. One side of the lower forward-pushing rack is provided with a front resistant spring. A lower part of the forward-pushing frame comprises an arc-shaped push plate adapted to a curvature of the wheel. A U-shaped crank arm is disposed between the upper raised head and the lower raised head for fixation and connection. The U-shaped crank arm passes through two vertical through holes arranged on spiral heads of two ends of a bumper frame of a pneumatic tire bumper from the bottom-up. An upper end of the U-shaped crank arm is connected to the upper raised head via a fixing nail and a lower end of the U-shaped crank arm is connected to the lower raised head via a fixing nail so as to form connection between the pressure-bearing frame of the forward-pushing base and the pneumatic tire bumper. The grooves disposed on two sides of each of the upper raised head and the lower raised head match with a dual-fork head of the upper support plate and a dual-fork head of the lower support plate, respectively. The vertical slot of the middle part of the pressure-bearing frame of the forward-pushing base comprises an arc-shaped slot adapted to a curvature of a pneumatic tire disposed on an end part of a bumper. During crashing, the spiral heads of two ends of the bumper frame and the pneumatic tire thereon are pushed backward to enter the vertical slot, so that the forward-pushing frame connected to the pressure-bearing frame is pushed backward.

In a class of this embodiment, the backward-pulling base comprises a backward-pulling frame. A lower part of the backward-pulling frame comprises an arc-shaped backward-pressing plate adapted to the curvature of the wheel. An upper part of the backward-pulling frame comprises an upper backward-pulling rack. A middle part of the backward-pulling frame is connected to the lower backward-pulling rack via a transverse pull rod. One side of the lower backward-pulling rack is provided with a rear resistant spring. The upper backward-pulling rack meshes with an upper forward-pushing rack via one or more upper gears in an upper transmission box. The lower backward-pulling rack meshes with a lower forward-pushing rack via one or more lower gears in a lower transmission box. When the impact force pushes the forward-pushing base backward, the impact force simultaneously pulls the backward-pulling base forward, thereby enabling the arc-shaped push plate and the arc-shaped backward-pressing plate to press the wheel from opposite directions at the front side and the rear side.

In a class of this embodiment, the downward-pressing base comprises: a lower backward-pulling rack, a backward-pressing, and an arc-shaped downward-pressing plate. An upper end of the lower backward-pulling rack is hinged on the forward-pushing base via a fourth hinge shaft. An upper end of the backward-pressing is hinged on the backward-pulling base via a sixth hinge shaft. A lower end of the lower backward-pulling rack and a lower end of the backward-pressing are connected to the arc-shaped downward-pressing plate adapted to the curvature of the wheel. The arc-shaped downward-pressing plate comprises a front fixed base and a rear fixed base. The front fixed base is connected to a lower end of the lower backward-pulling rack via a fifth hinge shaft. The rear fixed base is connected to a lower end of the backward-pressing via a seventh hinge shaft. When the impact force pushes the forward-pushing base backward and pulls the backward-pulling base forward, the downward-pressing base is simultaneously pressed downward, and the arc-shaped downward-pressing plate is enabled to vertically press the wheel downward.

In a class of this embodiment, the front resistant spring is disposed between a front end of the fixing frame and the transverse push rod of the forward-pushing base. The rear resistant spring is disposed between a rear end of the fixing frame and a transverse pull rod of the reward-pulling base. The fixing frame is fixed on a longitudinal beam. When the impact force pushes the forward-pushing base backward and pulls the backward-pulling base forward, the front resistant spring and the rear resistant spring are forced to work simultaneously and compress, thereby producing opposite pressures, and buffering, absorbing, and decreasing the impact force.

In a class of this embodiment, the meshed upper gears, the upper forward-pushing rack, and the upper backward-pulling rack are horizontally disposed in the upper transmission box formed by the connection of an upper bottom box and an upper box cover. Each upper gear is fixed on the upper transmission box via an upper fixing nail. The upper fixing nail is also an axle of the upper gear. The upper transmission box is fixed on a side beam of an engine compartment via a fixing layering.

In a class of this embodiment, the meshed lower gears, the lower forward-pushing rack, and the lower backward-pulling rack are vertically disposed in the lower transmission box formed by connection of a lower bottom box and a lower box cover. Each lower gear is fixed on the lower transmission box via a lower fixing nail. The lower fixing nail is also an axle of each lower gear. The lower transmission box is fixed on a longitudinal beam of the engine compartment via the lower fixing nail.

The invention further provides a vehicle comprising an embracing mechanism for vehicle wheels. An embracing mechanism for vehicle wheels is disposed on a wheel. The embracing mechanism for vehicle wheels comprises: a forward-pushing base disposed in front of a wheel, a backward-pulling base disposed behind the wheel, and a downward-pressing base disposed above the wheel. The forward-pushing base is connected to the backward-pulling base via an upper transmission box and a lower transmission box. The lower transmission box is provided with a front resistant spring and a rear resistant spring. The downward-pressing base is hinged to the forward-pushing base and the backward-pulling base via hinge parts, respectively.

In a class of this embodiment, the embracing mechanism for vehicle wheels is disposed on each wheel of the vehicle and embracing mechanism for vehicle wheels of the front wheels and rear wheels are connected by a downward-pushing frame thereby forming a multi-wheel combined embracing structure. The downward-pushing frame comprises: a front section of the downward-pushing frame, a middle section of the downward-pushing frame, and a rear section of the downward-pushing frame. Left and right sides of a head end of the front section of the downward-pushing frame are connected to the clip feet of the lower ends of the pressure-bearing frames of the forward-pushing bases of front wheels via fixing parts. Left and right sides of a tail end of the rear section of the downward-pushing frame are connected to lower parts of the backward-pulling frames of the backward-pulling bases of rear wheels via fixing parts. The middle section of the downward-pushing frame is suspended on a vehicle chassis via a hanging part.

In a class of this embodiment, the fixing part of the head end of the front section of the downward-pushing frame is a concave clamp that is locked in the clip foot of the lower end of the pressure-bearing frame of the forward-pushing base of each front wheel and is fixed by a bolt. The fixing part of the tail end of the rear section of the downward-pushing frame is a triangle push frame and is connected to the lower part of the backward-pulling frame of the backward-pulling base of each rear wheel via a U-shaped clamp and a bolt. The hanging part of the downward-pushing frame functioning in hanging is a U-shaped hanging part. The U-shaped hanging part hangs the two sides of a rear end of the front section of the downward-pushing frame, two sides of a front end and a rear end of the middle section of the downward-pushing frame, and two sides of a front end of the rear section of the downward-pushing frame on the vehicle chassis. The three sections of the downward-pushing frame are able to slide in corresponding U-shaped hanging parts in the longitudinal direction, the three sections are in butt joint but are not connected.

In a class of this embodiment, the pneumatic tire bumpers of the front side and the rear side of the vehicle body are connected to the front side and the rear side of the vehicle body via an X-shaped telescopic boom and support beams disposed at two sides of the telescopic boom. Two front ends of the telescopic boom are connected to the bumper frame disposed at an inner side of the pneumatic tire bumper. Two rear ends of the telescopic boom are connected to a cross beam of the front side and a cross beam of the rear side of the vehicle body, respectively, so as to form a telescopic bumper frame. The support beams of two sides of the telescopic boom are disposed in the longitudinal beam of the front side of the vehicle and the longitudinal beam of the rear side of the vehicle so as to support the pneumatic tire bumpers at the front side and the rear side of the vehicle body.

In a class of this embodiment, the telescopic boom comprises a first crank arm and a second crank arm which are hinged in an X-shape. Front ends of the two crank arms are respectively hinged on first left and right support bases fixed on the bumper frame via first left and right hinge shafts. Rear ends of the two crank arms are respectively hinged on second left and right support bases fixed on the cross beam via second left and right hinge shafts. Central parts of the two crank arms are hinged on a third support base fixed on a middle of the cross beam via a third hinge shaft. A link point of the first crank arm and the second crank arm is connected to a central spring disposed in the third support base of the cross beam, whereby producing the telescopic bumper frame.

In a class of this embodiment, one end of the support beam disposed at two sides of the telescopic boom is fixed on a base disposed on the bumper frame outside of the telescopic boom, and the other end of the support beam together with a part of the support beam is inserted in a longitudinal beam of the vehicle, whereby supporting the bumper frame. Under the action of the telescopic boom, the bumper frame moves forward and backward along the longitudinal beam whereby achieving the telescoping effect.

In a class of this embodiment, the pneumatic tire bumper comprises the bumper frame and the pneumatic tire comprising the cavity. The pneumatic tire comprising the cavity is disposed on the bumper frame. The bumper frame employs an arc frame. A facade of the bumper frame is an inward concave surface. Two ends of the bumper frame are each provided with a spiral head. The spiral head comprises the vertical through hole and a fixed clamp for clamping the pneumatic tire. An upper support plate comprising an upper padding plate is disposed above the bumper frame and a lower support plate comprising a lower padding plate is disposed below the bumper frame, and both the upper support plate and the lower support plate have a shape corresponding to that of the bumper frame. Two ends of the upper support plate and the lower support plate of the bumper frame are each provided with a dual-fork head. Two ends of the pneumatic tire are each provided with an end cap. The end cap is configured to clamp with the fixed clamp of the spiral head, and a clip ring and a fixed nail are disposed outside of the end cap to fix the end cap on the spiral head. Thus, the pneumatic tire is fixed on the bumper frame. When collision occurs at the front or the rear of the vehicle, the impact force is firstly dampened and absorbed by the pneumatic tire bumper of the front side or the rear side of the vehicle body, and then the embracing mechanism for vehicle wheels is initiated to embrace the wheel so as to protect the front or the rear of the vehicle from crushing and damage and further protect the safety of the passengers.

Advantages of according to embodiments of the invention are summarized as follows:

Compared with the conventional anti-crash technology, in which, the impact energy is dampened and absorbed by compression and deformation of the front section and the rear section of the vehicle body, the embracing mechanism for vehicle wheels according to embodiments of the invention is capable of effectively buffering, absorbing, and decreasing the strong impact produced in the crash, and converting the horizontal impact force transmitted in the longitudinal direction of the vehicle body into opposite pressures and vertically downward force so as to embrace the wheel. A plurality of pneumatic tires of the wheels subjects and buffers the impact force, so that the multi-wheel combined embracing structure is formed. The excellent bearing and compression performance of the pneumatic tire is utilized to transmit the impact force to the ground, so that the vehicle structure is prevented from crushing and damage and the passengers are protected, thereby realizing impact resistance and vehicle protection. The embracing mechanism for vehicle wheels of the invention can be applied to different kinds of vehicles, such as cars, MPV, SUV, and commercial vehicles, particularly to vehicles having a flat end, so that the safety of the vehicles is largely improved.

Figure 1:
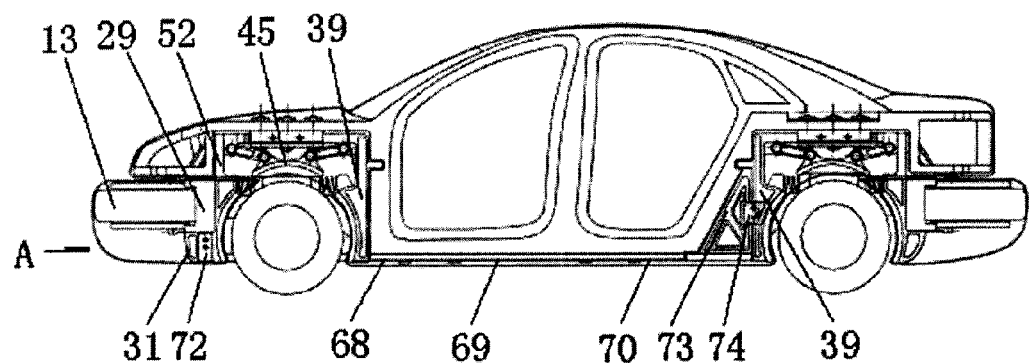
FIG. 1 is a structure diagram of a vehicle comprising an embracing mechanism for vehicle wheels.

In the drawings, the following reference numbers are used: 1. Upper support plate; 2. Charging inlet; 3. Upper padding plate; 4. First crank arm; 5. Bumper frame; 6. First hinge shaft; 7. First support base; 8. Base; 9. Clip ring; 10. End cap; 11. Fixed clamp; 12. Cavity; 13. Pneumatic tire; 14. Through hole; 15. Spiral head; 16. Support beam; 17. Second hinge shaft; 18. Second support base; 19. Second crank arm; 20. Third support base; 21. Central spring; 22. Third hinge shaft; 23. Cross beam; 24. Longitudinal beam; 25. Dual-fork head; 26. Concave surface; 27. Lower support plate; 28. Lower padding plate; 29. Pressure-bearing frame; 30. Lower raised head; 31. Clip foot; 32. Arc-shaped push plate; 33. Lower transmission box; 34. Fixing frame; 35. Rear fixed base; 36. Seventh hinge shaft; 37. Rear resistant spring; 38. Arc-shaped backward-pressing plate; 39. Backward-pulling frame; 40. Backward-pressing frame; 41. Sixth hinge shaft; 42. Upper backward-pulling rack; 43. Fixing layering; 44. Upper transmission box; 45. Arc-shaped downward-pressing plate 46. Front fixed base; 47. Fifth hinge shaft; 48. Pushing frame; 49. Upper forward-pushing rack; 50. Fourth hinge shaft; 51. Front resistant spring; 52. Forward-pushing frame; 53. Upper raised head; 54. U-shaped crank arm; 55. Lower bottom box; 56. Lower backward-pulling rack; 57. Lower box cover; 58. Lower gear; 59. Lower forward-pushing rack; 60. Transverse push rod; 61. Upper bottom box; 62. Upper box cover; 63. Groove; 64. Transverse pull rod; 65. Upper gear; 66. Upper fixing nail; 67. Lower fixing nail; 68. Front section of downward-pushing frame; 69. Middle section of downward-pushing frame; 70. Rear section of downward-pushing frame; 71. U-shaped hanging part; 72. Concave clamp; 73. Triangle push frame; 74. U-shaped clamp; and 75. Vertical slot.

DETAILED DESCRIPTION OF THE EMBODIMENTS

For further illustrating the invention, experiments detailing an embracing mechanism for vehicle wheels and a vehicle comprising the same are described hereinbelow combined with the drawings.

An embracing mechanism for vehicle wheels comprises: a forward-pushing base disposed in front of a wheel, a backward-pulling base disposed behind the wheel, and a downward-pressing base disposed above the wheel. The forward-pushing base is connected to the backward-pulling base via an upper transmission box 44 and a lower transmission box 33. The lower transmission box 33 is provided with a front resistant spring 51 and a rear resistant spring 37. The downward-pressing base is hinged to the forward-pushing base and the backward-pulling base via hinge parts, respectively. The structure is specifically described as follows:

The forward-pushing base comprises a forward-pushing frame 52 and a pressure-bearing frame 29 connected to a middle part of the forward-pushing frame 52. An upper part of a front end of the pressure-bearing frame 29 is provided with an upper raised head 53, and a lower part of the front end of the pressure-bearing frame 29 is provided with a lower raised head 30. Two sides of each of the upper raised head 53 and the lower raised head 30 comprise grooves 63. A middle part of the pressure-bearing frame 29 is provided with a vertical slot 75. An upper part of the forward-pushing frame 52 is connected to an upper forward-pushing rack 49. A bottom part of the forward-pushing frame 52 comprises a clip foot 31. A middle part of the forward-pushing frame 52 is connected to a lower forward-pushing rack 59 via a transverse push rod 60. One side of the lower forward-pushing rack 59 is provided with a front resistant spring 51. A lower part of the forward-pushing frame 52 comprises an arc-shaped push plate 32 adapted to a curvature of the wheel. A U-shaped crank arm 54 is disposed between the upper raised head 53 and the lower raised head 30 for fixation and connection. The U-shaped crank arm 54 passes through two vertical through holes 14 arranged on spiral heads 15 of two ends of a bumper frame 5 of a pneumatic tire bumper from the bottom-up. An upper end of the U-shaped crank arm 54 is connected to the upper raised head 53 via a fixing nail and a lower end of the U-shaped crank arm 54 is connected to the lower raised head 30 via a fixing nail so as to form connection between the pressure-bearing frame 29 of the forward-pushing base and the pneumatic tire bumper. The grooves 63 disposed on two sides of each of the upper raised head 53 and the lower raised head 30 match with a dual-fork head 25 of the upper support plate 1 and a dual-fork head 25 of the lower support plate 27, respectively. The vertical slot 75 of the middle part of the pressure-bearing frame 29 of the forward-pushing base comprises an arc-shaped slot adapted to a curvature of a pneumatic tire disposed on an end part of a bumper. The spiral heads 15 of the bumper frame 5 and the pneumatic tire disposed outside the spiral heads 15 are disposed in the vertical slot 75. During crashing, the spiral heads 15 of the bumper frame and the pneumatic tire disposed outside the spiral heads 15 are pushed backward to enter the vertical slot 75, so that the pressure-bearing frame 29 and the forward-pushing frame 52 connected to the pressure-bearing frame 29 are pushed backward, thereby pushing the forward-pushing base to move backward, as shown in FIGS. 1-7, 11-12.

The backward-pulling base comprises a backward-pulling frame 39. A lower part of the backward-pulling frame 39 comprises an arc-shaped backward-pressing plate 38 adapted to the curvature of the wheel. An upper part of the backward-pulling frame 39 comprises an upper backward-pulling rack 42. A middle part of the backward-pulling frame 39 is connected to the lower backward-pulling rack 56 via a transverse pull rod 64. One side of the lower backward-pulling rack 56 is provided with a rear resistant spring 37. The upper backward-pulling rack 42 meshes with an upper forward-pushing rack 49 via one or more upper gears 65 in an upper transmission box 44. Three upper gears 65 are employed in this embodiment. The lower backward-pulling rack 56 meshes with a lower forward-pushing rack 59 via one or more lower gears 58 in a lower transmission box 33. Three lower gears 58 are employed in this embodiment. When the impact force pushes the forward-pushing base backward, the impact force simultaneously pulls the backward-pulling base forward, thereby enabling the arc-shaped push plate 32 and the arc-shaped backward-pressing plate 38 to press the wheel from opposite directions at a front side and a rear side, as shown in FIGS. 1-7.

Figure 2:
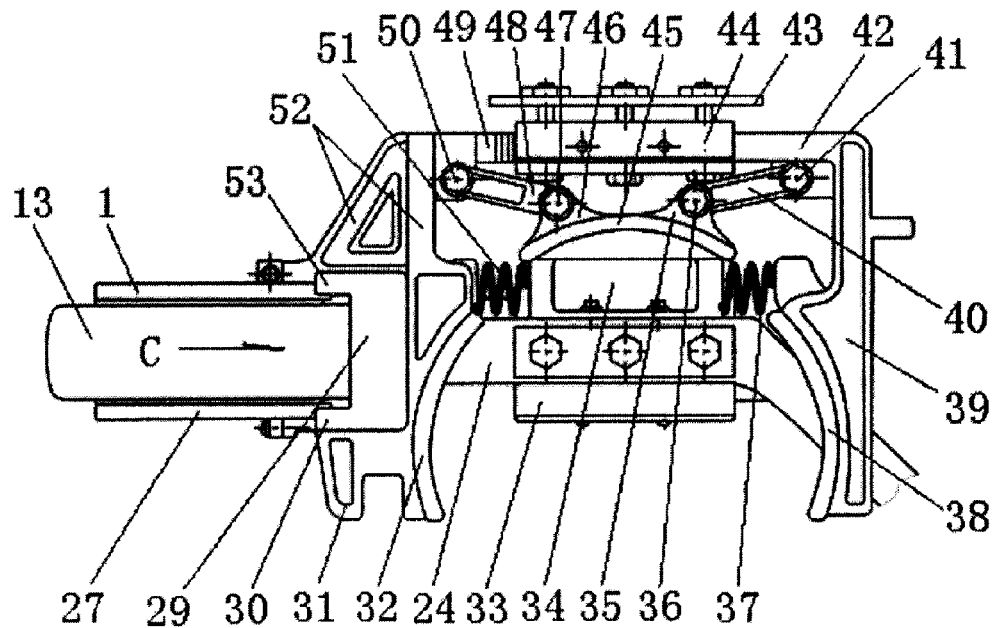
FIG. 2 is a partial enlarged view of FIG. 1.
Figure 3:
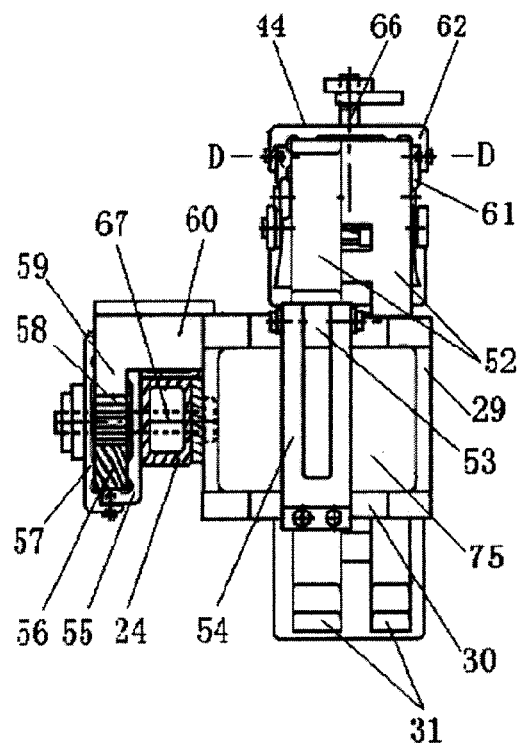
FIG. 3 is a view of FIG. 2 taken from arrow C.

The downward-pressing base comprises: a lower backward-pulling rack 48, a backward-pressing 40, and an arc-shaped downward-pressing plate 45. An upper end of the lower backward-pulling rack 48 is hinged on the forward-pushing base via a fourth hinge shaft 50. An upper end of the backward-pressing 40 is hinged on the backward-pulling base via a sixth hinge shaft 41. A lower end of the lower backward-pulling rack 48 and a lower end of the backward-pressing 40 are connected to the arc-shaped downward-pressing plate 45 adapted to the curvature of the wheel. The arc-shaped downward-pressing plate 45 comprises a front fixed base 46 and a rear fixed base 35. The front fixed base 46 is connected to a lower end of the lower backward-pulling rack 48 via a fifth hinge shaft 47. The rear fixed base 35 is connected to a lower end of the backward-pressing 40 via a seventh hinge shaft 36. When the impact force pushes the forward-pushing base backward and pulls the backward-pulling base forward, the downward-pressing base is simultaneously pressed downward, and the arc-shaped downward-pressing plate 45 is enabled to vertically press the wheel downward, as shown in FIGS. 1-2.

Figure 4:
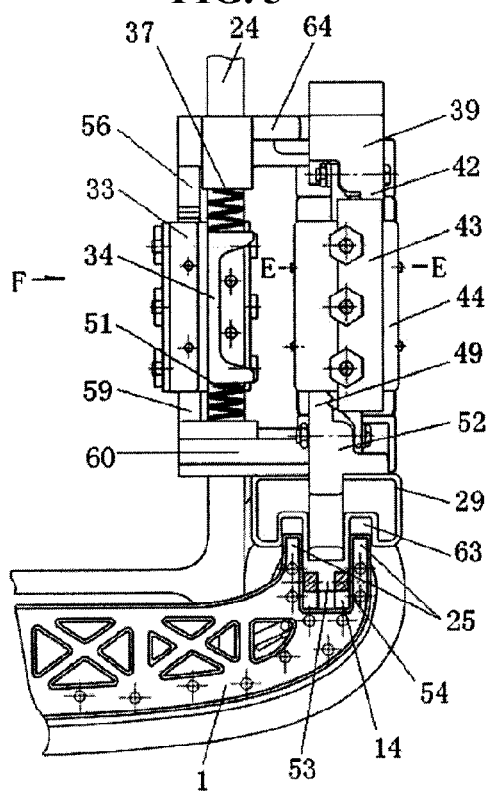
FIG. 4 is a top view of FIG. 2.
Figure 5:
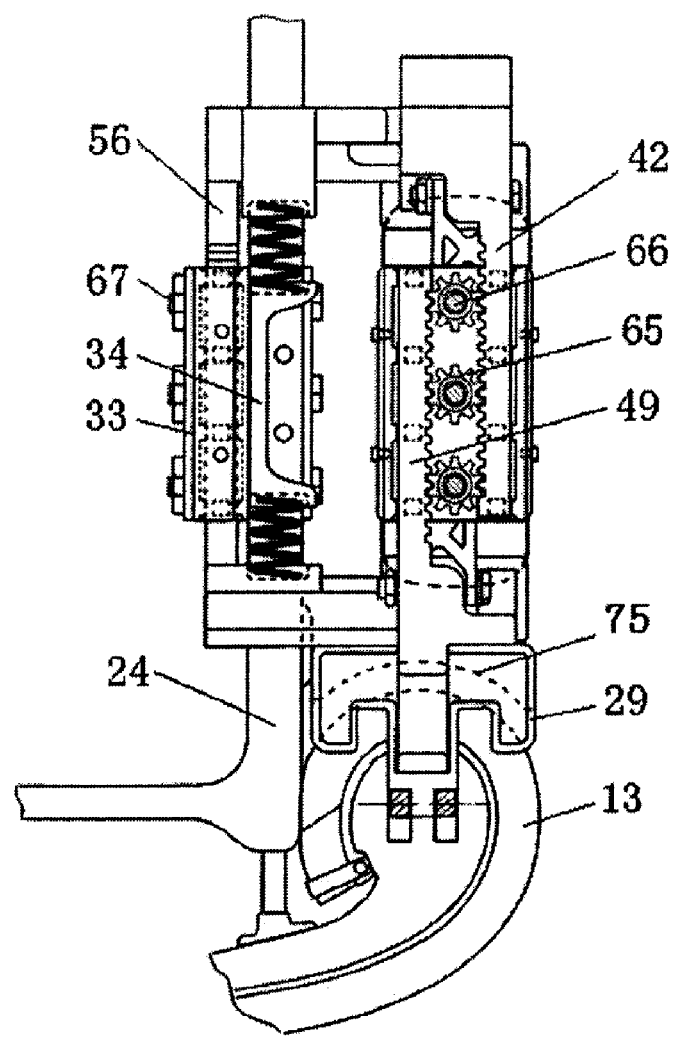
FIG. 5 is a semi-perspective view of FIG. 4 and is a sectional view of FIG. 3 taken from line D-D.
Figure 6:
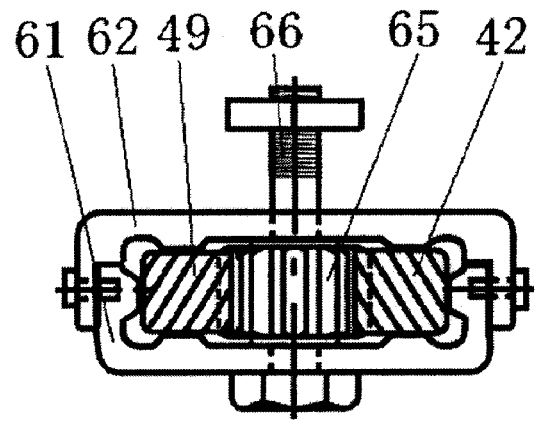
FIG. 6 is a sectional view of FIG. 4 taken from line E-E.
Figure 7:
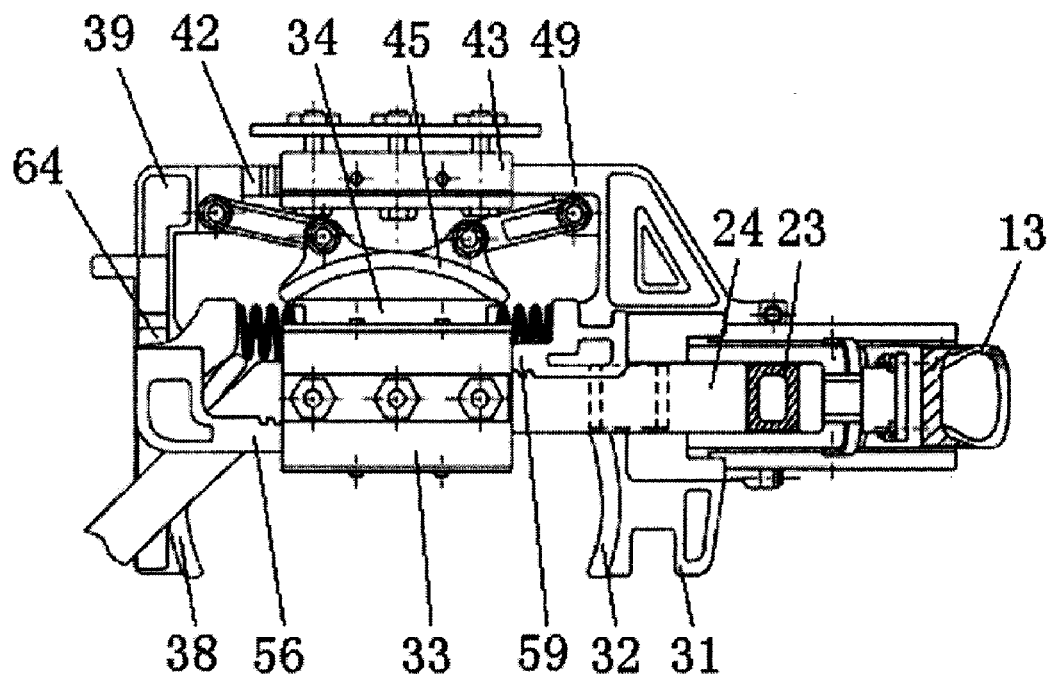
FIG. 7 is a view of FIG. 4 taken from arrow F.
Figure 8:
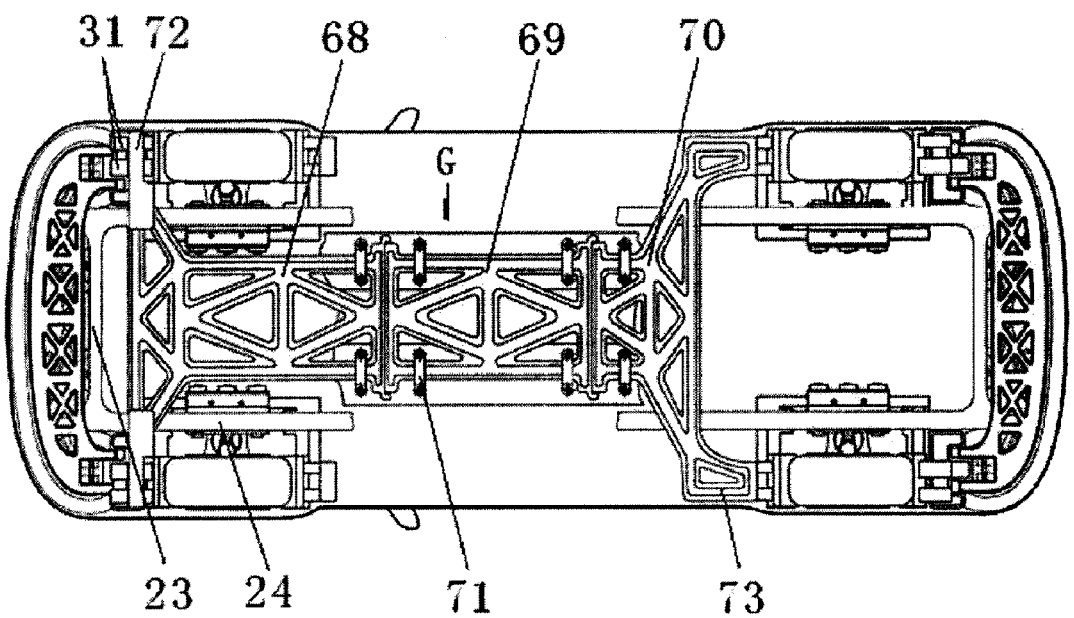
FIG. 8 is a bottom view of FIG. 1.
Figure 9:
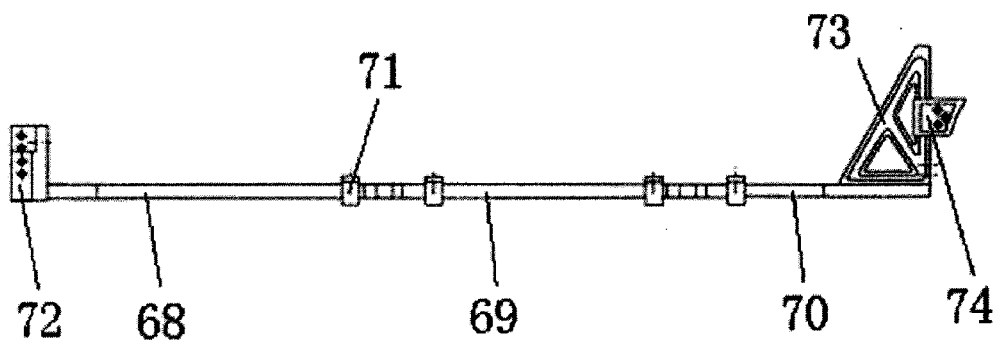
FIG. 9 is a schematic diagram of a downward-pushing frame of FIG. 8 taken from arrow G.
Figure 10:
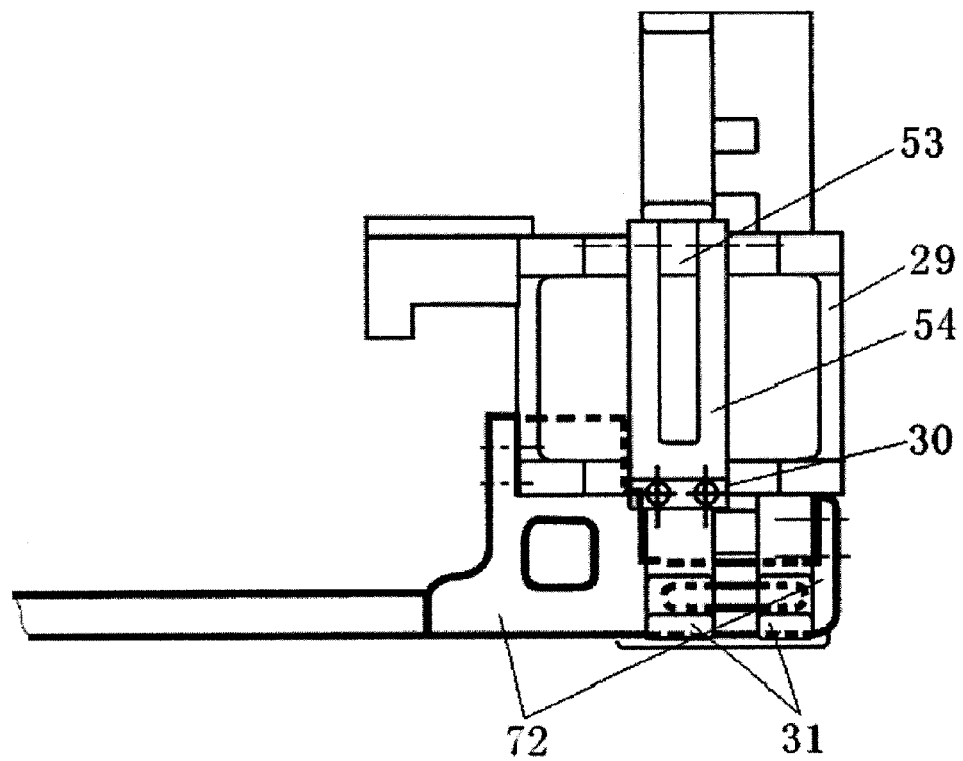
FIG. 10 is a partial perspective view of FIG. 1 from arrow A, which is basically the same as FIG. 3 and indicates a head end of a front section of a downward-pushing frame locked in a clip foot of a forward-pushing base.

The front resistant spring 51 is disposed between a front end of the fixing frame 34 and the transverse push rod 60 of the forward-pushing base. The rear resistant spring 37 is disposed between a rear end of the fixing frame 34 and a transverse pull rod 64 of the reward-pulling base. The fixing frame 34 is fixed on a longitudinal beam 24. When the impact force pushes the forward-pushing base backward and pulls the backward-pulling base forward, the front resistant spring 51 and the rear resistant spring 37 are forced to work simultaneously and compress, thereby producing opposite pressures, and buffering, absorbing, and decreasing the impact force, as shown in FIGS. 2, 4-5.

The meshed upper gears 65, the upper forward-pushing rack 49, and the upper backward-pulling rack 42 are horizontally disposed in the upper transmission box 44 formed by the connection of an upper bottom box 61 and an upper box cover 62. Each upper gear 65 is fixed on the upper transmission box 44 via an upper fixing nail 66. The upper fixing nail 66 is also an axle of the upper gear 65. The upper transmission box 44 is fixed on a side beam of an engine compartment via a fixing layering 43. The meshed lower gears 58, the lower forward-pushing rack 59, and the lower backward-pulling rack 56 are vertically disposed in the lower transmission box 33 formed by the connection of a lower bottom box 55 and a lower box cover 57. Each lower gear 58 is fixed on the lower transmission box 33 via a lower fixing nail 67. The lower fixing nail 67 is also an axle of each lower gear 58. The lower transmission box 33 is fixed on a longitudinal beam 24 of the engine compartment via the lower fixing nail 67, as shown in FIGS. 3-7.

A vehicle comprising an embracing mechanism for vehicle wheels is also provided. An embracing mechanism for vehicle wheels is disposed on a wheel. The embracing mechanism for vehicle wheels comprises: a forward-pushing base disposed in front of a wheel, a backward-pulling base disposed behind the wheel, and a downward-pressing base disposed above the wheel. The forward-pushing base is connected to the backward-pulling base via an upper transmission box 44 and a lower transmission box 33. The lower transmission box 33 is provided with a front resistant spring 51 and a rear resistant spring 37. The downward-pressing base is hinged to the forward-pushing base and the backward-pulling base via hinge parts, respectively. The embracing mechanism for vehicle wheels is disposed on each wheel of the vehicle and embracing mechanism for vehicle wheels of the front wheels and rear wheels are connected by a downward-pushing frame, thereby forming a multi-wheel combined embracing structure.

The downward-pushing frame comprises: a front section 68 of the downward-pushing frame, a middle section 69 of the downward-pushing frame, and a rear section 70 of the downward-pushing frame. The fixing part of the head end of the front section 68 of the downward-pushing frame is a concave clamp 72 that is locked in the clip foot 31 of the lower end of the pressure-bearing frame 29 of the forward-pushing base of each front wheel and is fixed by a bolt. The fixing part of the tail end of the rear section 70 of the downward-pushing frame is a triangle push frame 73 and is connected to the lower part of the backward-pulling frame 39 of the backward-pulling base of each rear wheel via a U-shaped clamp 74 and a bolt. The hanging part of the downward-pushing frame functioning in hanging is a U-shaped hanging part 71. The U-shaped hanging part 71 hangs the two sides of a rear end of the front section 68 of the downward-pushing frame, two sides of a front end and a rear end of the middle section 69 of the downward-pushing frame, and two sides of a front end of the rear section 70 of the downward-pushing frame on the vehicle chassis. The three sections of the downward-pushing frame are able to slide in corresponding U-shaped hanging parts in the longitudinal direction. The three sections are in butt joint but are not connected, as shown in FIGS. 1-2, 8-10.

Figure 11:
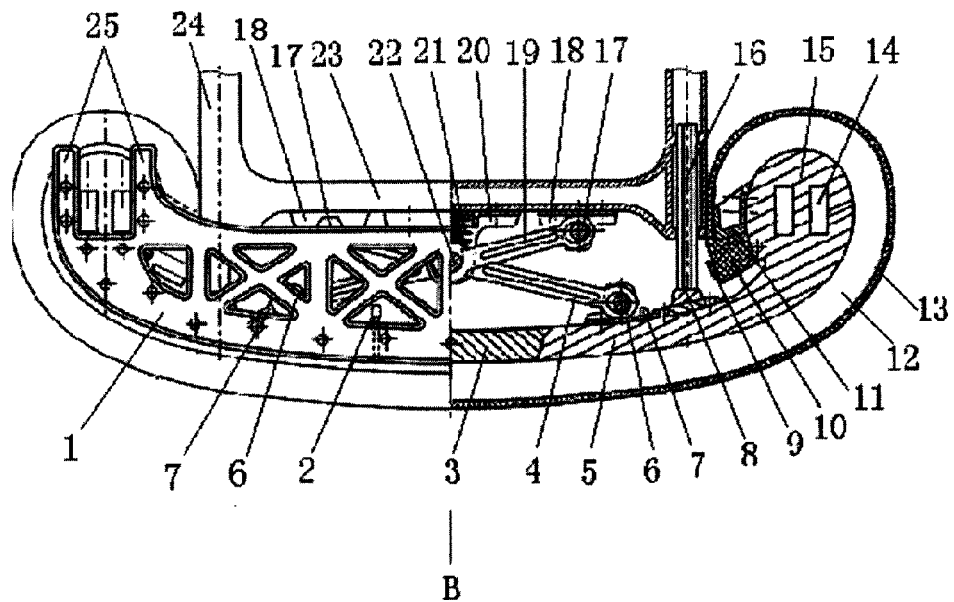
FIG. 11 is a top view of a pneumatic tire bumper.
Figure 12:
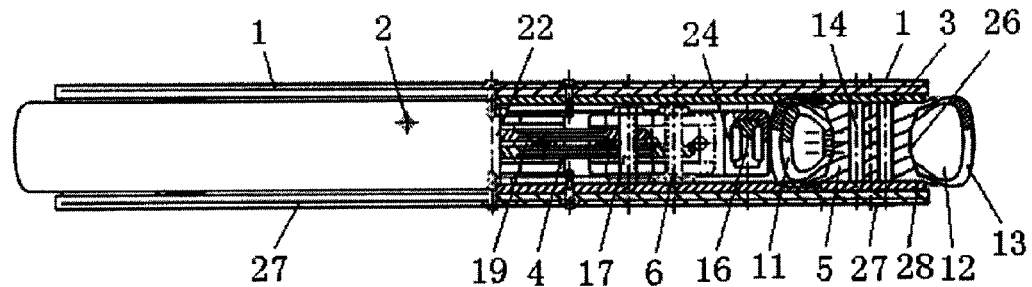
FIG. 12 is a view of FIG. 11 taken from arrow B.

The pneumatic tire bumpers of the front side and the rear side of the vehicle body are connected to the front side and the rear side of the vehicle body via an X-shaped telescopic boom and support beams 16 disposed at two sides of the telescopic boom. Two front ends of the telescopic boom are connected to the bumper frame 5 disposed at an inner side of the pneumatic tire bumper. Two rear ends of the telescopic boom are connected to a cross beam 23 of the front side and a cross beam 23 of the rear side of the vehicle body, respectively, so as to form a telescopic bumper frame. The support beams 16 of two sides of the telescopic boom are disposed in the longitudinal beam 24 of the front side of the vehicle and the longitudinal beam 24 of the rear side of the vehicle so as to support the pneumatic tire bumpers at the front side and the rear side of the vehicle body. The pneumatic tire bumper comprises a bumper frame 5 and a pneumatic tire 13 comprising a cavity 12. The pneumatic tire 13 comprising the cavity 12 is disposed on the bumper frame 5. The bumper frame 5 employs an arc frame. A facade of the bumper frame is an inward concave surface 26. Two ends of the bumper frame are each provided with a spiral head 15. The spiral head comprises a vertical through hole 14 and a fixed clamp 11 for clamping the pneumatic tire 13. An upper support plate 1 comprising an upper padding plate 3 is disposed above the bumper frame and a lower support plate 27 comprising a lower padding plate 28 is disposed below the bumper frame, and both the upper support plate and the lower support plate have a shape corresponding to that of the bumper frame. Two ends of the upper support plate 1 and the lower support plate 27 of the bumper frame 5 are each provided with a dual-fork head 25. Two ends of the pneumatic tire 13 are each provided with an end cap 10. The end cap 10 is configured to clamp with the fixed clamp 11 of the spiral head 15, and a clip ring 9 and a fixed nail are disposed outside of the end cap to fix the end cap on the spiral head 15. Thus, the pneumatic tire 13 is supported by the inward concave surface 26 of the facade of the bumper frame 5 and then is fixed on the bumper frame 5. The pneumatic tire 13 comprises a charging inlet 2 for aerating the pneumatic tire 13. A U-shaped crank arm 54 is disposed between the upper raised head 53 and the lower raised head 30 of the front end of the pressure-bearing frame 29 of the forward-pushing base for fixation and connection. The U-shaped crank arm 54 passes through two vertical through holes 14 arranged on spiral heads 15 of two ends of a bumper frame 5 of a pneumatic tire bumper from the bottom-up. An upper end of the U-shaped crank arm 54 is connected to the upper raised head 53 via a fixing nail and a lower end of the U-shaped crank arm 54 is connected to the lower raised head 30 via a fixing nail so as to form connection between the pressure-bearing frame 29 of the forward-pushing base and the pneumatic tire bumper. The grooves 63 disposed on two sides of each of the upper raised head 53 and the lower raised head 30 match with a dual-fork head 25 of the upper support plate 1 and a dual-fork head 25 of the lower support plate 27, respectively. The vertical slot 75 of the middle part of the pressure-bearing frame 29 of the forward-pushing base comprises an arc-shaped slot adapted to a curvature of a pneumatic tire disposed on an end part of a bumper. The spiral heads 15 of the bumper frame 5 and the pneumatic tire disposed outside the spiral heads 15 are disposed in the vertical slot 75. During crashes, the spiral heads 15 of the bumper frame and the pneumatic tire disposed outside the spiral heads 15 are pushed backward to enter the vertical slot 75 of the pressure-bearing frame 29, so that the pressure-bearing frame 29 and the forward-pushing frame 52 connected to the pressure-bearing frame 29 are pushed backward, thereby pushing the forward-pushing base to move backward, driving the backward-pulling base to move forward, and driving the downward-pressing base to move downward, and finally embracing the wheel from the front side, the rear side, the upper side of the wheel. The telescopic boom comprises a first crank arm 4 and a second crank arm 19 which are hinged in an X-shape. Front ends of the two crank arms are respectively hinged on first left and right support bases 7 fixed on the bumper frame 5 via first left and right hinge shafts 6. Rear ends of the two crank arms are respectively hinged on second left and right support bases 18 fixed on the cross beam 23 via second left and right hinge shafts 17. Central parts of the two crank arms are hinged on a third support base 20 fixed on a middle of the cross beam 23 via a third hinge shaft 22. A link point of the first crank arm 4 and the second crank arm 19 is connected to a central spring 21 disposed in the third support base 20 of the cross beam 23, whereby producing the telescopic bumper frame. One end of the support beam 16 disposed at two sides of the telescopic boom is fixed on a base 8 disposed on the bumper frame 5 outside of the telescopic boom, and the other end of the support beam 16 together with a part of the support beam 16 is inserted in a longitudinal beam of the vehicle, whereby supporting the bumper frame 5. Under the action of the telescopic boom, the bumper frame 5 moves forward and backward along the longitudinal beam 24 whereby achieving the telescoping effect, as shown in FIGS. 11-12.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. An embracing mechanism for vehicle wheels, the mechanism comprising: a forward-pushing base disposed in front of a wheel, a backward-pulling base disposed behind the wheel, and a downward-pressing base disposed above the wheel;
   wherein
      the forward-pushing base is connected to the backward-pulling base via an upper transmission box and a lower transmission box;
      the lower transmission box is provided with a front resistant spring and a rear resistant spring; and
      the downward-pressing base is hinged to the forward-pushing base and the backward-pulling base via hinge parts, respectively.

2. The mechanism of claim 1, wherein
the forward-pushing base comprises a forward-pushing frame and a pressure-bearing frame connected to a middle part of the forward-pushing frame; an upper part of a front end of the pressure-bearing frame is provided with an upper raised head, and a lower part of the front end of the pressure-bearing frame is provided with a lower raised head; two sides of each of the upper raised head and the lower raised head comprise grooves; a middle part of the pressure-bearing frame is provided with a vertical slot; a bottom part of the forward-pushing frame comprises a clip foot; an upper part of the forward-pushing frame is connected to an upper forward-pushing rack; a lower part of the forward-pushing frame comprises an arc-shaped push plate adapted to a curvature of the wheel; a middle part of the forward-pushing frame is connected to a lower forward-pushing rack via a transverse push rod; one side of the lower forward-pushing rack is provided with a front resistant spring;
the backward-pulling base comprises a backward-pulling frame; a lower part of the backward-pulling frame comprises an arc-shaped backward-pressing plate adapted to the curvature of the wheel; an upper part of the backward-pulling frame comprises an upper backward-pulling rack; a middle part of the backward-pulling frame is connected to the lower backward-pulling rack via a transverse pull rod; one side of the lower backward-pulling rack is provided with a rear resistant spring; the upper backward-pulling rack meshes with an upper forward-pushing rack via one or more upper gears in an upper transmission box; the lower backward-pulling rack meshes with a lower forward-pushing rack via one or more lower gears in a lower transmission box; and
the downward-pressing base comprises: a lower backward-pulling rack, a backward-pressing, and an arc-shaped downward-pressing plate; an upper end of the lower backward-pulling rack is hinged on the forward-pushing base via a fourth hinge shaft; an upper end of the backward-pressing is hinged on the backward-pulling base via a sixth hinge shaft; a lower end of the lower backward-pulling rack and a lower end of the backward-pressing are connected to the arc-shaped downward-pressing plate adapted to the curvature of the wheel; the arc-shaped downward-pressing plate comprises a front fixed base and a rear fixed base; the front fixed base is connected to a lower end of the lower backward-pulling rack via a fifth hinge shaft; and the rear fixed base is connected to a lower end of the backward-pressing via a seventh hinge shaft.

3. The mechanism of claim 2, wherein the vertical slot of the middle part of the pressure-bearing frame of the forward-pushing base comprises an arc-shaped slot adapted to a curvature of a pneumatic tire disposed on an end part of a bumper.

4. The mechanism of claim 2, wherein a U-shaped crank arm is disposed between the upper raised head and the lower raised head for fixation and connection; the U-shaped crank arm passes through two vertical through holes arranged on spiral heads of two ends of a bumper frame of a pneumatic tire bumper from the bottom-up; an upper end of the U-shaped crank arm is connected to the upper raised head via a fixing nail and a lower end of the U-shaped crank arm is connected to the lower raised head via a fixing nail so as to form connection between the pressure-bearing frame of the forward-pushing base and the pneumatic tire bumper; the grooves disposed on two sides of each of the upper raised head and the lower raised head match with a dual-fork head of the upper support plate and a dual-fork head of the support plate, respectively.

5. The mechanism of claim 2, wherein the front resistant spring is disposed between a front end of the fixing frame and the transverse push rod of the forward-pushing base; the rear resistant spring is disposed between a rear end of the fixing frame and a transverse pull rod of the reward-pulling base; and the fixing frame is fixed on a longitudinal beam.

6. The mechanism of claim 2, wherein
the meshed upper gears, the upper forward-pushing rack, and the upper backward-pulling rack are horizontally disposed in the upper transmission box formed by connection of an upper bottom box and an upper box cover; each upper gear is fixed on the upper transmission box via an upper fixing nail; the upper fixing nail is also an axle of the upper gear; the upper transmission box is fixed on a side beam of an engine compartment via a fixing layering; and
the meshed lower gears, the lower forward-pushing rack, and the lower backward-pulling rack are vertically disposed in the lower transmission box formed by connection of a lower bottom box and a lower box cover; each lower gear is fixed on the lower transmission box via a lower fixing nail; the lower fixing nail is also an axle of each lower gear; and the lower transmission box is fixed on a longitudinal beam of the engine compartment via the lower fixing nail.

7. A vehicle comprising an embracing mechanism for vehicle wheels, wherein
an embracing mechanism for vehicle wheels is disposed on a wheel;
the embracing mechanism for vehicle wheels comprises: a forward-pushing base disposed in front of a wheel, a backward-pulling base disposed behind the wheel, and a downward-pressing base disposed above the wheel;
the forward-pushing base is connected to the backward-pulling base via an upper transmission box and a lower transmission box;
the lower transmission box is provided with a front resistant spring and a rear resistant spring; and
the downward-pressing base is hinged to the forward-pushing base and the backward-pulling base via hinge parts, respectively.

8. The vehicle of claim 7, wherein
the embracing mechanism for vehicle wheels is disposed on each wheel of the vehicle and embracing mechanism for vehicle wheels of the front wheels and rear wheels are connected by a downward-pushing frame thereby forming a multi-wheel combined embracing structure;
the downward-pushing frame comprises: a front section of the downward-pushing frame, a middle section of the downward-pushing frame, and a rear section of the downward-pushing frame; and
left and right sides of a head end of the front section of the downward-pushing frame are connected to the clip feet of the lower ends of the pressure-bearing frames of the forward-pushing bases of front wheels via fixing parts; left and right sides of a tail end of the rear section of the downward-pushing frame are connected to lower parts of the backward-pulling frames of the backward-pulling bases of rear wheels via fixing parts; and the middle section of the downward-pushing frame is suspended on a vehicle chassis via a hanging part.

9. The vehicle of claim 8, wherein
the fixing part of the head end of the front section of the downward-pushing frame is a concave clamp that is locked in the clip foot of the lower end of the pressure-bearing frame of the forward-pushing base of each front wheel and is fixed by a bolt;

the fixing part of the tail end of the rear section of the downward-pushing frame is a triangle push frame and is connected to the lower part of the backward-pulling frame of the backward-pulling base of each rear wheel via a U-shaped clamp and a bolt; and the hanging part of the downward-pushing frame functioning in hanging is a U-shaped hanging part; the U-shaped hanging part hangs the two sides of a rear end of the front section of the downward-pushing frame, two sides of a front end and a rear end of the middle section of the downward-pushing frame, and two sides of a front end of the rear section of the downward-pushing frame on the vehicle chassis.

\* \* \* \* \*